US009736380B2

(12) United States Patent
Aiba

(10) Patent No.: US 9,736,380 B2
(45) Date of Patent: Aug. 15, 2017

(54) DISPLAY CONTROL APPARATUS, CONTROL METHOD, AND STORAGE MEDIUM

(71) Applicant: CANON KABUSHIKI KAISHA, Tokyo (JP)

(72) Inventor: Toshitaka Aiba, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 8 days.

(21) Appl. No.: 14/638,263

(22) Filed: Mar. 4, 2015

(65) Prior Publication Data
US 2015/0264268 A1 Sep. 17, 2015

(30) Foreign Application Priority Data

Mar. 17, 2014 (JP) .................. 2014-053984

(51) Int. Cl.
G03B 13/00 (2006.01)
H04N 5/232 (2006.01)
G02B 6/293 (2006.01)

(52) U.S. Cl.
CPC ..... *H04N 5/23293* (2013.01); *G02B 6/29334* (2013.01); *H04N 5/23229* (2013.01); *G06T 2207/10052* (2013.01)

(58) Field of Classification Search
CPC ........... H04N 5/23293; H04N 13/0282; H04N 13/0228; H04N 13/0271; G06T 2207/10052
USPC ........................................ 348/333.01, 220.01
See application file for complete search history.

(56) References Cited

U.S. PATENT DOCUMENTS

| 8,849,064 | B2* | 9/2014 | Mocanu | G06T 5/003 348/333.12 |
| 8,917,343 | B2* | 12/2014 | You | H04N 1/00411 348/333.05 |
| 9,137,457 | B2* | 9/2015 | Park | H04N 1/00167 |
| 9,380,281 | B2* | 6/2016 | Kagaya | H04N 9/87 |
| 2011/0273471 | A1* | 11/2011 | Nagasaka | H04N 5/23212 345/619 |
| 2012/0044400 | A1* | 2/2012 | Okada | H04N 5/23212 348/333.01 |
| 2012/0194544 | A1* | 8/2012 | Yokohata | H04N 5/23229 345/619 |

(Continued)

FOREIGN PATENT DOCUMENTS

JP 2008-219878 A 9/2008

Primary Examiner — Ngoc-Yen Vu
(74) Attorney, Agent, or Firm — Carter, DeLuca, Farrell & Schmidt, LLP

(57) ABSTRACT

A display control apparatus determines determine whether or not light field information with which an image whose focus state has been changed can be generated is associated with a second image in a second focus state that is different from a first image in a first focus state corresponding to the light field information. If it is determined that the light field information is associated with the second image, the display control apparatus displays a first display item that notifies that the second image is present on a display device together with the first image. In response to receiving an input of an instruction on the first display item, the display control apparatus displays the second image associated with the light field information on the display device.

18 Claims, 10 Drawing Sheets

(56) References Cited

U.S. PATENT DOCUMENTS

2015/0009391 A1* 1/2015 Kim .................. H04N 5/23216
348/333.05
2015/0181124 A1* 6/2015 S V .................... H04N 5/23258
348/46

* cited by examiner

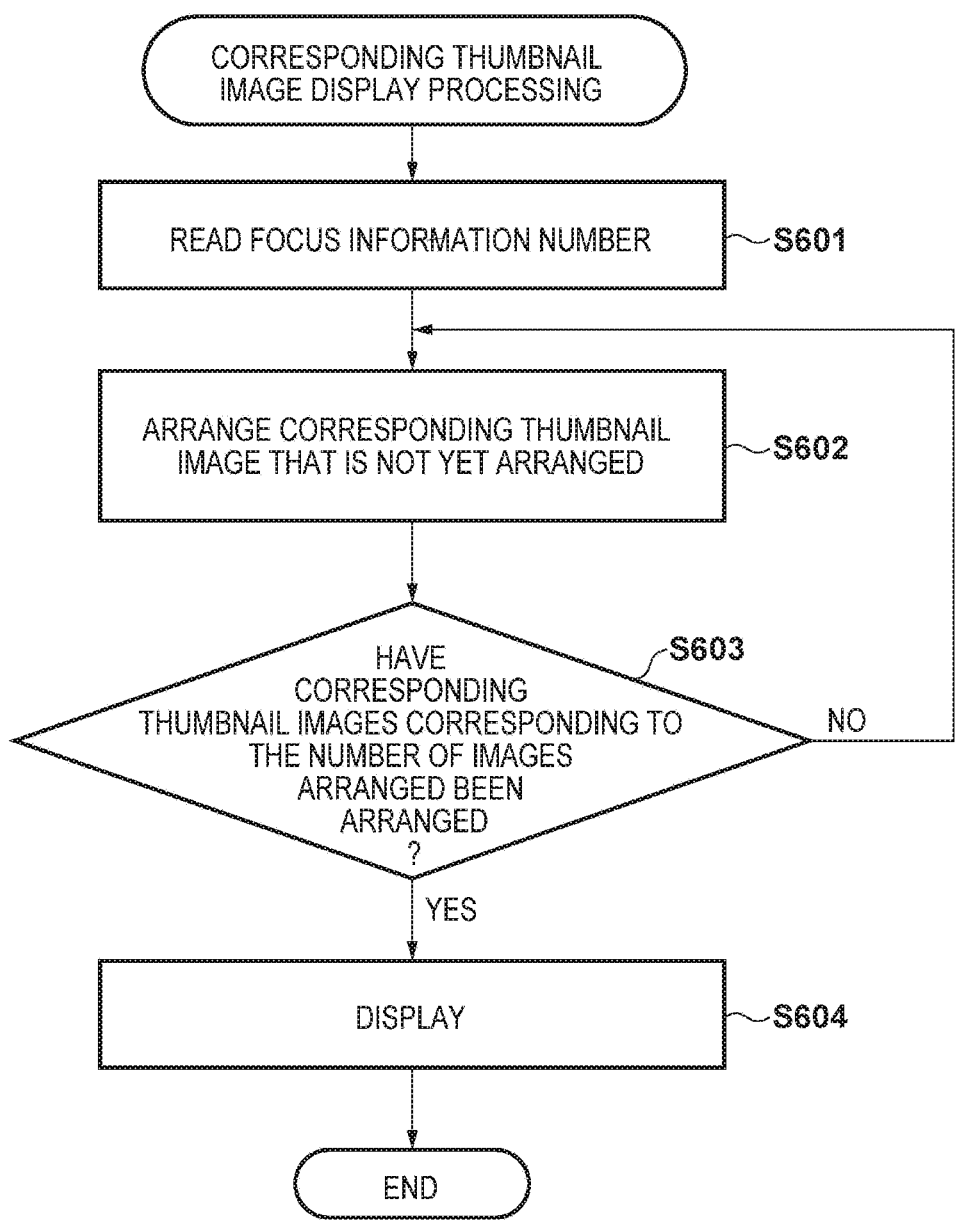

F I G. 11
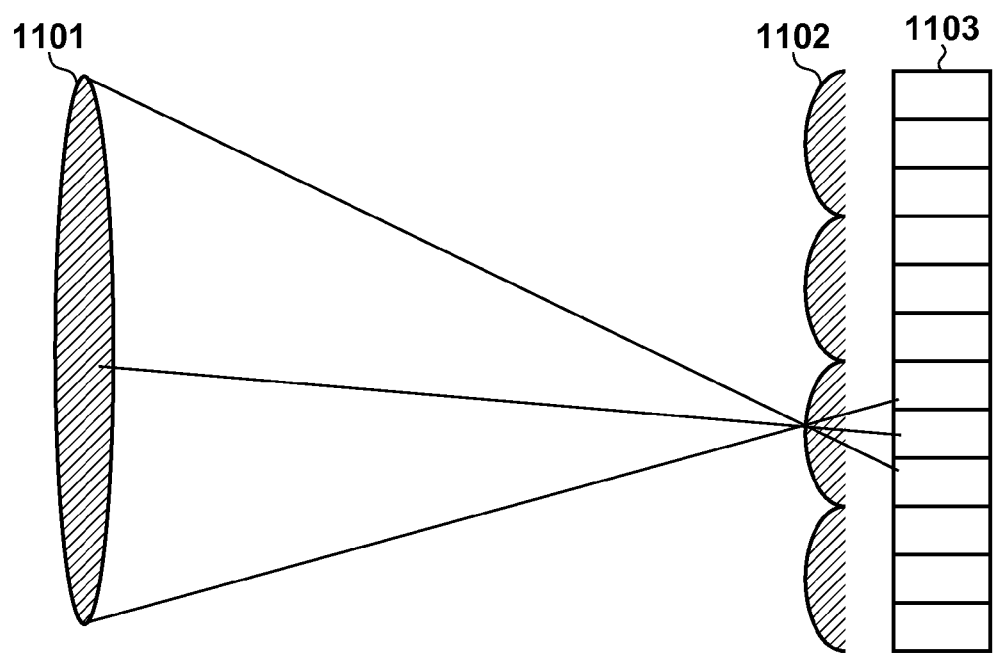

DISPLAY CONTROL APPARATUS, CONTROL METHOD, AND STORAGE MEDIUM

BACKGROUND OF THE INVENTION

Field of the Invention

The present invention relates to a display control apparatus, a control method, and a storage medium.

Description of the Related Art

Some image capturing apparatuses such as digital cameras are capable of outputting an image signal that can generate, after image-capturing, an image in a focus state that is different from that of an image obtained by the image-capturing. In an image capturing apparatus such as a so-called plenoptic camera, as shown in FIG. 11, a microlens array 1102 is provided between an image capturing element 1103 and a lens 1101 of an optical system. By configuring an image capturing optical system in this way, pupil division that divides a light flux incident on each microlens can be performed so as to record an image. That is, with such an image capturing apparatus, light reflected from a subject can be recorded as an image signal (light field information) with respect to the position and direction of incidence. By using the light field information obtained in the manner described above to perform pixel sorting based on predetermined criteria, it is possible to reproduce a light distribution in a plane corresponding to a predetermined focal length.

The light field information indicates pixel values of different adjacent pixels corresponding to a light flux that has undergone pupil division, and it is therefore not possible to obtain an image representing a subject by simply being displayed without changing the sequence. In order to obtain an image representing a subject, a light distribution in a plane corresponding to a specific focal length (plane focused to a specific subject distance) is reproduced, and thereafter it is necessary to perform reconstruction processing for generating pixels by adding up pixels corresponding to the light flux that has undergone pupil division. However, the reconstruction processing requires a predetermined computation time. Accordingly, in the case of, for example, generating and list displaying images relating to a plurality of pieces of light field information, it may take time to generate an image based on each piece of light field information and list display the generated images. To address this, Japanese Patent Laid-Open No. 2008-219878 discloses a method in which a thumbnail image generated by thinning out pixels is recorded together with the light field information and the thumbnail images are list displayed.

However, because images in different focus states focused in a plurality of subject distances can be generated based on the light field information, the displayed thumbnail images may not be in a desired focus state.

To address this, it is conceivable to record in advance the thumbnail images corresponding to a plurality of subject distances together with their light field information, but if all of the plurality of thumbnail images are displayed in a list, the plurality of images in different focus states are arranged on the same screen. Particularly, on a display of a list displaying a plurality of pieces of light field information, not only a group of thumbnail images in many similar focus states are arranged with respect to a single piece of light field information, but also a plurality of such groups of thumbnail images are arranged as a whole. Accordingly, it has been difficult for the user to find a desired image.

SUMMARY OF THE INVENTION

The present invention was made in view of the problems encountered with the conventional technique. The present invention provides a display control apparatus, a control method, and a storage medium wherein the visibility of the list is improved and the user can easily view an image in a desired focus state.

The present invention in its first aspect provides a display control apparatus comprising: a determining unit configured to determine whether or not light field information with which an image whose focus state has been changed can be generated is associated with a second image in a second focus state that is different from a first image in a first focus state corresponding to the light field information; and a display control unit configured to, in a case where it is determined by the determining unit that the light field information is associated with the second image, display a first display item that notifies that the second image is present on a display unit together with the first image, wherein in response to receiving an input of an instruction on the first display item, the display control unit displays the second image associated with the light field information on the display unit.

The present invention in its second aspect provides a control method for controlling a display control apparatus, the method comprising: a determining step of determining whether or not light field information with which an image whose focus state has been changed can be generated is associated with a second image in a second focus state that is different from a first image in a first focus state corresponding to the light field information; and a display control step of, in a case where it is determined in the determining step that the light field information is associated with the second image, displaying a first display item that notifies that the second image is present on a display unit together with the first image, wherein in response to receiving an input of an instruction on the first display item, in the display control step, the second image associated with the light field information is displayed on the display unit.

Further features of the present invention will become apparent from the following description of exemplary embodiments (with reference to the attached drawings).

BRIEF DESCRIPTION OF THE DRAWINGS

FIG. 6 is a flowchart illustrating corresponding thumbnail image display processing executed by the PC 100 according to an embodiment of the present invention.

FIG. 11 is a diagram showing an example of a configuration of an optical system used to acquire light field information.

DESCRIPTION OF THE EMBODIMENTS

Embodiments

Hereinafter, an exemplary embodiment of the present invention will be described in detail with reference to the drawings. The embodiment given below will be described taking, as an example, a case where the present invention is applied to a PC as an example of a display control apparatus that is capable of generating an image in a predetermined focus state (reconstructed image) from light field information. However, the present invention is applicable to any device that is capable of generating a reconstructed image from light field information.

Configuration of PC 100

Figure 1:
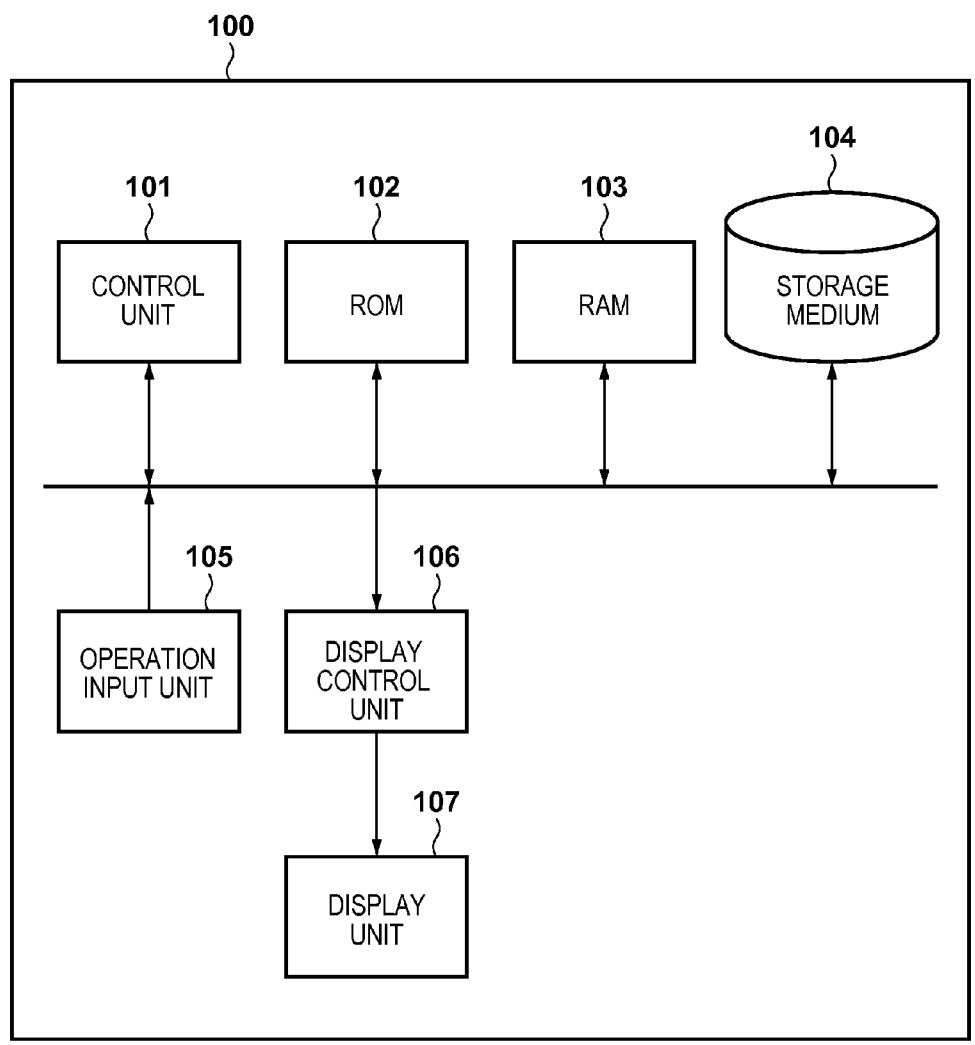
FIG. 1 is a diagram showing a functional configuration of a PC 100 according to an embodiment of the present invention.

FIG. 1 is a block diagram showing a functional configuration of a PC 100 according to an embodiment of the present invention.

A control unit 101 is, for example, a CPU, and is configured to control operations of the blocks included in the PC 100. To be specific, the control unit 101 controls the operations of the blocks by reading an operation program for operating the blocks that is stored in a ROM 102 or a storage medium 104, extracting the program into a RAM 103, and executing the program.

The ROM 102 is an electrically rewritable non-volatile memory. The ROM 102 stores therein not only the operation program for operating the blocks included in the PC 100, but also parameters and the like that are required to operate the blocks. The RAM 103 is a volatile memory. The RAM 103 is used not only as an area for extraction of the operation program for operating the blocks, but also as a storage area for temporarily storing intermediate data and the like that are output as a result of the operations of the blocks.

The storage medium 104 is, for example, a storage medium that is removably connected to the PC 100, such as a HDD or a memory card. In the storage medium 104, the operation program for operating the blocks of the PC 100, an application program that causes functions to be implemented in the operations of the blocks, and the like are stored. In the present embodiment, it is assumed that an image-viewing application program, which will be described later, is stored in the storage medium 104. It is also assumed in the present embodiment that images that are to be viewed in the image-viewing application, light field information, and the like are stored in the storage medium 104.

An operation input unit 105 is a user interface included in the PC 100 such as a mouse or a key board. Upon receiving an input of an operation performed on the user interface, the operation input unit 105 outputs a corresponding control signal to the control unit 101.

A display control unit 106 controls the content displayed on a display unit 107. The display control unit 106 may include, for example, a rendering device such as a GPU, and may be configured to generate an image displayed on the display unit 107 in accordance with an instruction from the control unit 101. The display unit 107 is, for example, a display device such as an LCD. The display unit 107 may be built in the PC 100, or may be an external device connected to the PC 100.

Operations of Image-Viewing Application

Hereinafter, the operations of the image-viewing application executed by the PC 100 of the present embodiment will be described.

Figure 3:
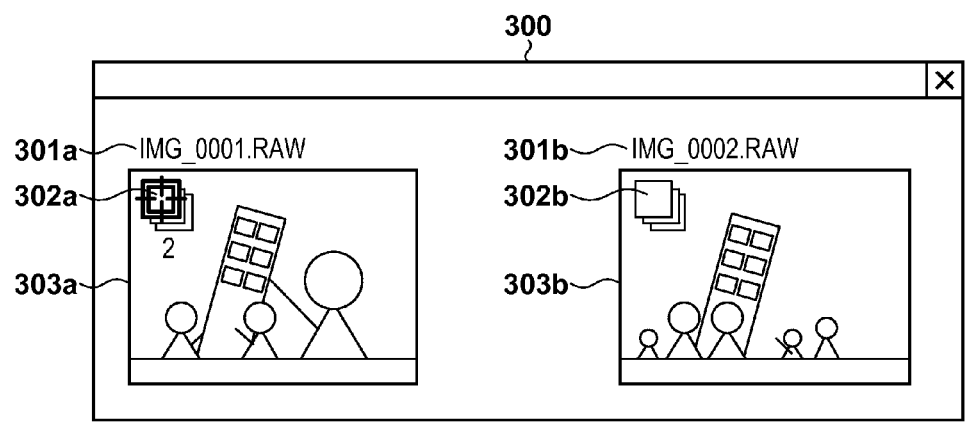
FIG. 3 is a diagram illustrating an application window list displaying image files according to an embodiment of the present invention.

Upon activation of the image-viewing application, images corresponding to image files stored in a predetermined storage area in the storage medium 104 are list displayed in an application window 300 shown in FIG. 3. As described above, it is not possible to view corresponding images unless reconstructed image generation processing is performed on the light field information. Accordingly, it is assumed that the light field information used in the present embodiment is associated with thumbnail images generated in predetermined focus states. In the present embodiment, it is assumed that the light field information is stored in a RAW format file, and the file contains thumbnail image data.

Configuration of Light Field Information File

A configuration of a light field information file used in the present embodiment will now be described in detail with reference to FIG. 2. It is assumed that the light field information file is recorded as a result of image-capturing by using a plenoptic camera as described above.

Figure 2:
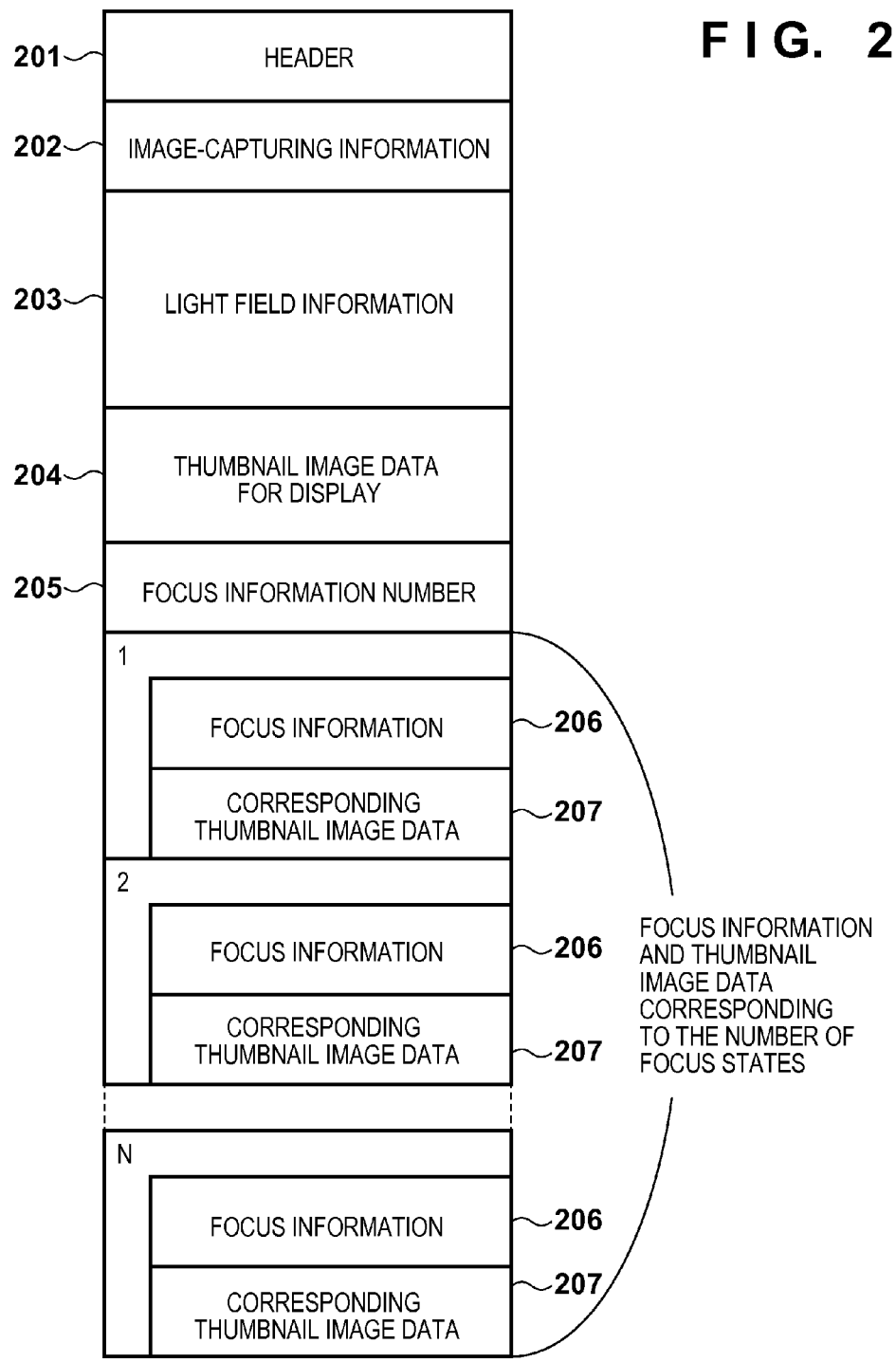
FIG. 2 is a diagram showing a data structure of a light field information file according to an embodiment of the present invention.

As shown in FIG. 2, the light field information file contains light field information 203 corresponding to digital data of the output of the image capturing element of the plenoptic camera, as well as information required to perform list display and reconstructed image generation. To be specific, a header 201 is arranged at the head of the file, the header 201 including the definition of the file, information indicating that the file is a light field information file, and the like. Then, image-capturing information 202 is arranged after the header 201, the image-capturing information 202 being information indicating the date and time of image-capturing when the light field information 203 was obtained, the model name used for the image-capturing, and image-capturing conditions such as the focal length set for the image-capturing.

After the light field information 203, thumbnail image data for display 204 is arranged that is displayed as a thumbnail image of the light field information file when the light field information file is displayed in a list. In the present embodiment, it is assumed that the thumbnail image data for display 204 is generated based on a reconstructed image represented in a so-called deep focus, which is the focus state having a large depth of field, so that the user can recognize subjects that were present in the environment where the image-capturing, in which the light field information file was obtained, took place. That is, a reconstructed image that is equivalent to the image captured with a small aperture and that is generated using, among the light field information 203, only information corresponding to light fluxes that have passed through a limited pupil region is used as the thumbnail image data for display 204. The present embodiment will be described assuming that the thumbnail image data for display 204 is a deep focus image, but the embodiment of the present invention is not limited thereto. The image for display that is displayed in the image-viewing application so as to show the overview of a light field information file may be, for example, an image obtained based on a reconstructed image represented in a predetermined focus state.

Also, the light field information file of the present embodiment may contain, in addition to the thumbnail image for display, a thumbnail image in a focus state different from that of the image for display. The thumbnail image (corresponding thumbnail image) in a focus state different from that of the image for display may be, for example, a thumbnail image obtained based on a reconstructed image generated such that a subject selected by the photographer using a plenoptic camera during image-capturing when the light field information was obtained is brought into in-focus state. Alternatively, the corresponding thumbnail image may comprise, for example, thumbnail images obtained based on reconstructed images in a predetermined number of focus states from among a plurality of focus states that can be generated based on the light field information obtained during image-capturing, or may be a thumbnail image based on a reconstructed image focused to a predetermined subject distance. The light field information file of the present embodiment includes a focus information number 205 indicating the number of corresponding thumbnail images as described above. In addition, the light field information file also includes focus information 206 and corresponding thumbnail image data 207 with respect to each of a number of corresponding thumbnail images corresponding to the number indicated by the focus information number 205.

The focus information 206 may contain, for example, conditions used when generating a corresponding thumbnail image based on the light field information 203, information regarding the subject that is in in-focus state in the corresponding thumbnail image, and the like. The information regarding the subject that is in in-focus state in the corresponding thumbnail image may be, for example, information that identifies the position (coordinates) of the subject in in-focus state in the corresponding thumbnail image, or may be information that identifies the position of a subject selected by the photographer during image-capturing. Alternatively, the information regarding the subject that is in in-focus state in the corresponding thumbnail image may be information regarding the subject distance to the subject in in-focus state, the corresponding focal length, or the like. Other than the above, the information regarding the subject that is in in-focus state in the corresponding thumbnail image may include information indicating the depth of field in the corresponding thumbnail image.

Display of Corresponding Thumbnail Images

In the image-viewing application of the present embodiment, at the time of list displaying light field information files, as shown in FIG. 3, the thumbnail image data for display 204 read from each light field information file is arranged and displayed in the application window 300. In FIG. 3, in order to simplify the description, it is assumed that only light field information files are stored in the storage area where the target files list displayed in the image-viewing application are stored. However, it is readily appreciated that the present invention is not limited to the application that displays only light field information files, and so-called ordinary image files that are different from the light field information files may be list displayed.

As shown in FIG. 3, with respect to a single light field information file, its file name 301 and a thumbnail image for display 303 (first image) are displayed. Also, in the image-viewing application of the present embodiment, at the time of list displaying light field information files, a focus information notification 302 is displayed by being superimposed on the thumbnail image for display 303.

The focus information notification 302 is an icon serving as a display item displayed when the target files that are list displayed are light field information files. If the light field information file contains corresponding thumbnail image data 207, the focus information notification 302 is displayed together with a character string indicating the number of pieces of corresponding thumbnail image data 207 (first display item). If the light field information file contains no corresponding thumbnail image data 207, the focus information notification 302 is displayed without such a character string (second display item). In the example shown in FIG. 3, two corresponding thumbnail image data 207 are included in a light field information file having a file name 301a, and thus a focus information notification 302a is superimposed on a thumbnail image for display 303a with a character string "2" being attached below. A light field information file having a file name 301b contains no corresponding thumbnail image data 207, and thus a focus information notification 302b is superimposed on a thumbnail image for display 303b without a character string.

Figure 4:
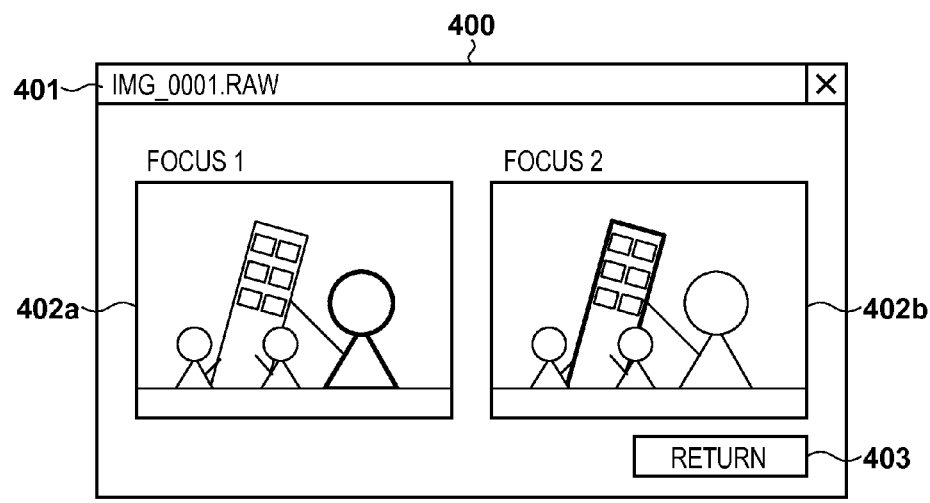
FIG. 4 is a diagram illustrating an application window list displaying corresponding thumbnail images according to an embodiment of the present invention.

The user can view more corresponding thumbnail image data 207 by inputting an instruction to the focus information notification 302 with the use of a pointing device such as, for example, a mouse in the application window 300 displayed as described above. To be specific, if an instruction is input to the focus information notification 302, and the related light field information file contains corresponding thumbnail image data 207, the window is transitioned to an application window 400 as shown in FIG. 4. Alternatively, the application window 400 is displayed in addition to the application window 300. In the application window 400, a file name 401 of the light field information file for which the instruction was input to the focus information notification 302a in FIG. 3 is displayed. Also, in the application window 400, two corresponding thumbnail images 402a and 402b (second images) obtained based on the corresponding thumbnail image data 207 contained in the light field information file are displayed in a line. In FIG. 4, the corresponding thumbnail image 402a is an image focused to a person who was near the camera when the image was captured, and the corresponding thumbnail image 402b is an image focused to the building located at a long distance away from the camera when the image was captured.

That is, in the image-viewing application of the present embodiment, at the time of list displaying a group of files including light field information files, only a thumbnail image for display set in each light field information file is displayed. At this time, if the light field information file contains a corresponding thumbnail image in a focus state different from that of the thumbnail image for display, a notification indicating the presence of the corresponding thumbnail image is displayed. Then, if an instruction is input to the notification, a screen is displayed in which the corresponding thumbnail image associated with the related light field information file is list displayed.

The user can revert back to the application window 300 that list displays image files by inputting an instruction to a return button 403 in the application window 400.

List Display Processing

Figure 5:
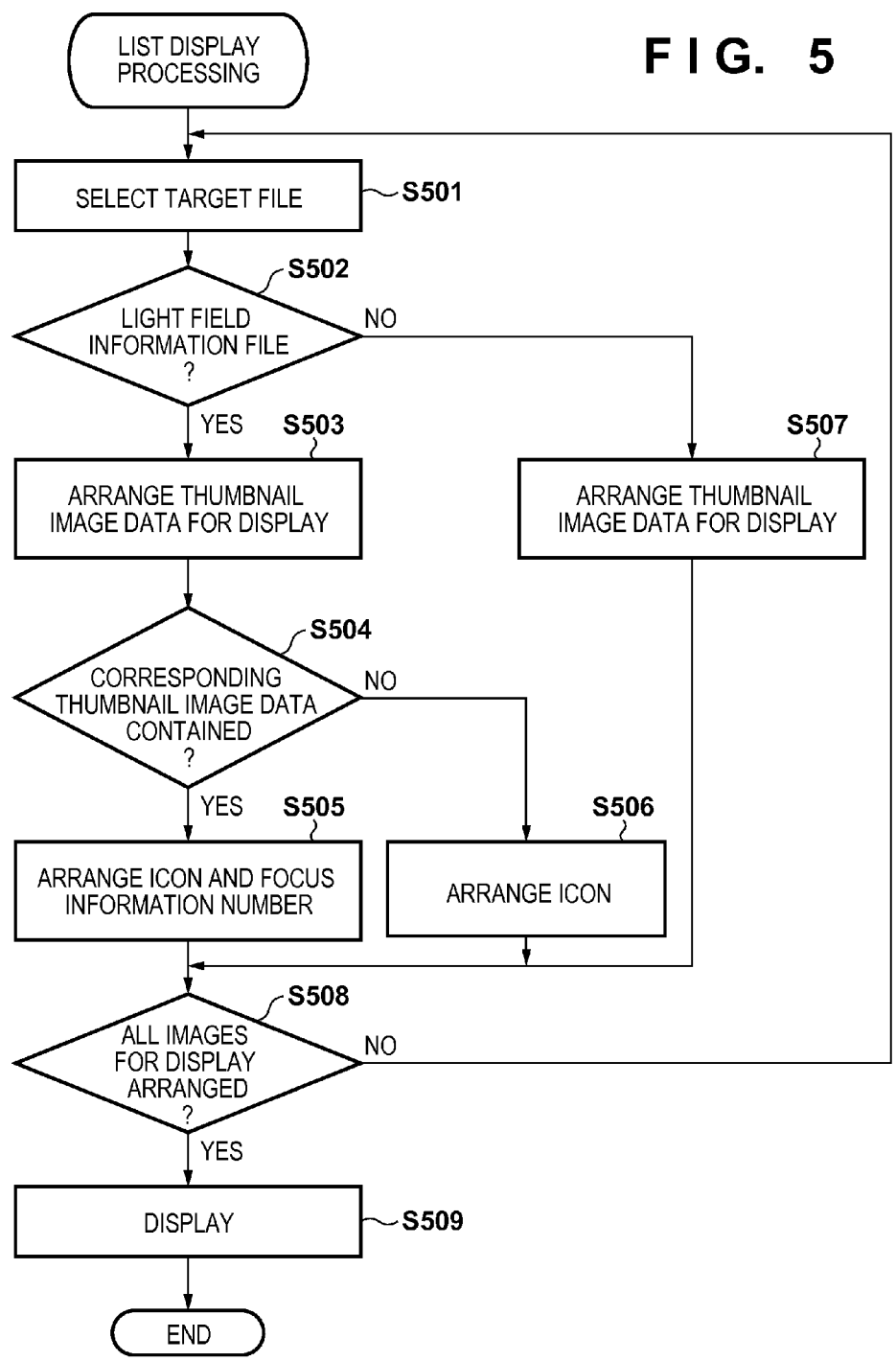
FIG. 5 is a flowchart illustrating list display processing executed by the PC 100 according to an embodiment of the present invention.

Hereinafter, a specific procedure of list display processing for performing list display in the image-viewing application of the present embodiment will be described with reference to a flowchart shown in FIG. 5. The processing corresponding to the flowchart can be implemented by the control unit 101 reading a corresponding processing program stored in the storage medium 104, extracting the program into the RAM 103, and executing the program. The description will be given assuming that the list display processing is, for example, started upon activation of the image-viewing application, and is also executed when the files that are list displayed are changed by a scrolling operation or the like.

In S501, the control unit 101 identifies files that are arranged in the application window 300 for list display from among a group of image files stored in a predetermined storage area in the storage medium 104. Then, the control unit 101 selects, from among the files, a single image file (target file) whose image for display is not arranged in the image data constituting the application window 300.

In S502, the control unit 101 determines whether or not the selected target file is a light field information file. To be specific, the control unit 101 reads the header 201 of the target file, and makes a determination in this step. If it is determined that the target file is a light field information file, the control unit 101 transitions the processing to S503. If it is determined that the target file is not a light field information file, because the target file is an ordinary image file, in S507, the control unit 101 sets an associated thumbnail image or an image generated through thinning as an image for display of the target file. Then, the display control unit 106 arranges the image for display and a character string indicating the file name of the target file in a corresponding region on the image data generated to constitute the application window 300.

If it is determined that the target file is a light field information file, in S503, the control unit 101 reads the thumbnail image data for display 204 of the target file, which is an image for display. Then, the control unit 101 transmits, to the display control unit 106, the read data and information regarding the file name of the target file so as to arrange the data and the information in a corresponding region on the image data constituting the application window 300.

In S504, the control unit 101 determines whether or not the target file contains corresponding thumbnail image data 207 other than the image for display. To be specific, the control unit 101 makes a determination in this step by referring to the focus information number 205 included in the target file, and determining whether or not the number of pieces of corresponding thumbnail image data included in the target file is 1 or more. If it is determined that the target file contains corresponding thumbnail image data 207 other than the image for display, the control unit 101 transitions the processing to S505. If it is determined that the target file does not contain corresponding thumbnail image data 207 other than the image for display, the control unit 101 transitions the processing to S506.

In S505, the control unit 101 transmits the focus information number 205 in the target file to the display control unit 106 so as to arrange the focus information number 205 together with an icon which is the focus information notification 302 in a region where the image for display of the target file is displayed on the image data constituting the application window 300.

If, on the other hand, it is determined that the target file does not contain corresponding thumbnail image data 207, in S506, the display control unit 106 arranges only the icon which is the focus information notification 302 in the region where the image for display of the target file is displayed on the image data constituting the application window 300.

In S508, the control unit 101 determines whether or not the images for display of all of the image files that need to be arranged in the application window 300 are arranged on the image data constituting the application window 300. If it is determined that the images for display of all of the image files are arranged, the control unit 101 transitions the processing to S509. If it is determined that there is an image file that is not yet arranged, the control unit 101 returns the processing to S501.

In S509, the control unit 101 displays, on the display unit 107, the image data constituting the application window 300 generated by the operation input unit 105, and terminates the list display processing.

Corresponding Thumbnail Image Display Processing

Next is a detailed description of corresponding thumbnail image display processing for list displaying corresponding thumbnail images executed when an instruction is input to the focus information notification 302 in the application window 300 displayed through the list display processing, with reference to a flowchart shown in FIG. 6. The processing corresponding to the flowchart is also executed by the control unit 101 in the same manner as described above.

In S601, the control unit 101 reads the focus information number 205 from the light field information file (target file) for which an instruction was input to the focus information notification 302, and stores the focus information number 205 in the RAM 103 as the number of images arranged.

In S602, the control unit 101 reads, from the target file, corresponding thumbnail image data 207 that is not yet arranged in the image data constituting the application window 400 for list displaying corresponding thumbnail images. Then, the control unit 101 transmits the read data to the display control unit 106 so as to arrange the data in a corresponding region on the image data constituting the application window 400.

In S603, the control unit 101 determines whether or not a number of corresponding thumbnail images corresponding to the number of images arranged are arranged in the image data constituting the application window 400. If it is determined that a number of corresponding thumbnail images corresponding to the number of images arranged are not arranged, the control unit 101 returns the processing to S602. If it is determined that a number of corresponding thumbnail images corresponding to the number of images arranged are arranged, the control unit 101 transitions the processing to S604.

In S604, the control unit 101 displays, on the display unit 107, the image data constituting the application window 400 generated by the operation input unit 105, and terminates the corresponding thumbnail image display processing.

In the manner described above, with the image-viewing application of the present embodiment, when a plurality of image files are list displayed, only an image for display associated with each of the plurality of image files is displayed, and a notification is made to notify that there is an image in a different focus state that is associated with the image file. Then, if an instruction is input to the notification, images in different focus states that are associated with the target light field information file other than the image for display are displayed. Accordingly, the user can easily find an image in a desired focus state, and view or select the image.

Addition of Corresponding Thumbnail Image Data

Figure 7A:
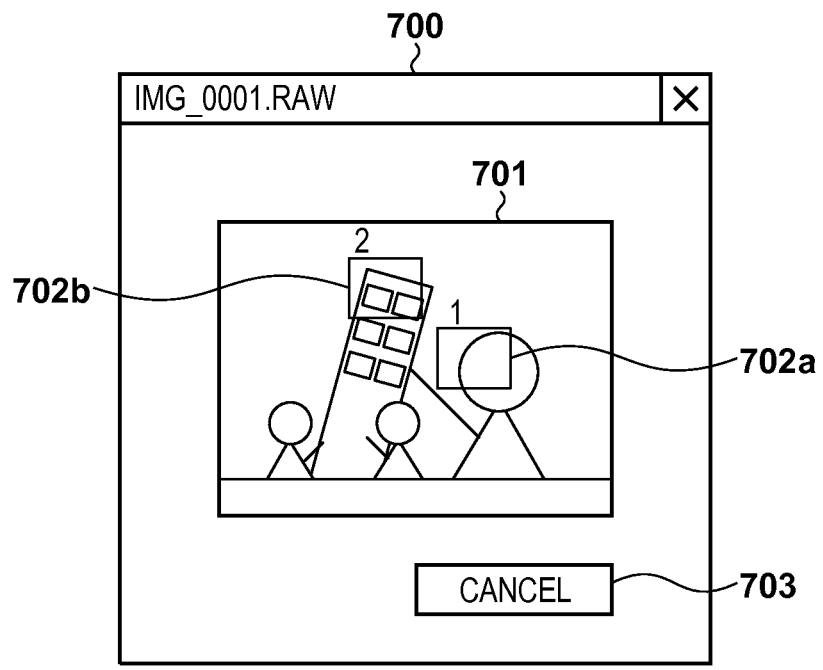
FIGS. 7A and 7B are diagrams illustrating a transition of display performed when a corresponding thumbnail image is added according to an embodiment of the present invention.

With the image-viewing application of the present embodiment, new corresponding thumbnail image data 207 can be generated and added to a light field information file. For example, if an instruction to select the thumbnail image for display of a light field information file as a new corresponding thumbnail image to be added is input in the application window 300 shown in FIG. 3, an in-focus position window 700 as shown in FIG. 7A is displayed.

In the in-focus position window 700, a thumbnail image for display 701 of the light field information file for which the selection instruction was input is displayed. Then, in the in-focus position window 700, an in-focus position marker 702 (third display item) indicating the position of a focused subject in each of the corresponding thumbnail image data 207 included in the file is superimposed and displayed on the thumbnail image for display 701. FIG. 7A shows, as an example, the in-focus position window 700 displayed when an instruction to select the thumbnail image for display 303a shown in FIG. 3 is input. As shown in FIG. 7A, in-focus position markers 702a and 702b are respectively superimposed at positions of the person and the building, which are focused subjects in the two corresponding thumbnail image data 207 included in the associated light field information file.

The user can check which subjects are focused in the corresponding thumbnail images included in the light field information file whose thumbnail image for display was selected in the in-focus position window 700 as described above. The user can revert back to the application window 300 for list displaying image files by inputting an instruction to a cancel button 703 in the in-focus position window 700. On the other hand, the user can transition the display to a reconstructed image window 710 for checking a corresponding thumbnail image that is newly added by inputting an instruction to designate a desired position on the thumbnail image for display 701.

Figure 7B:
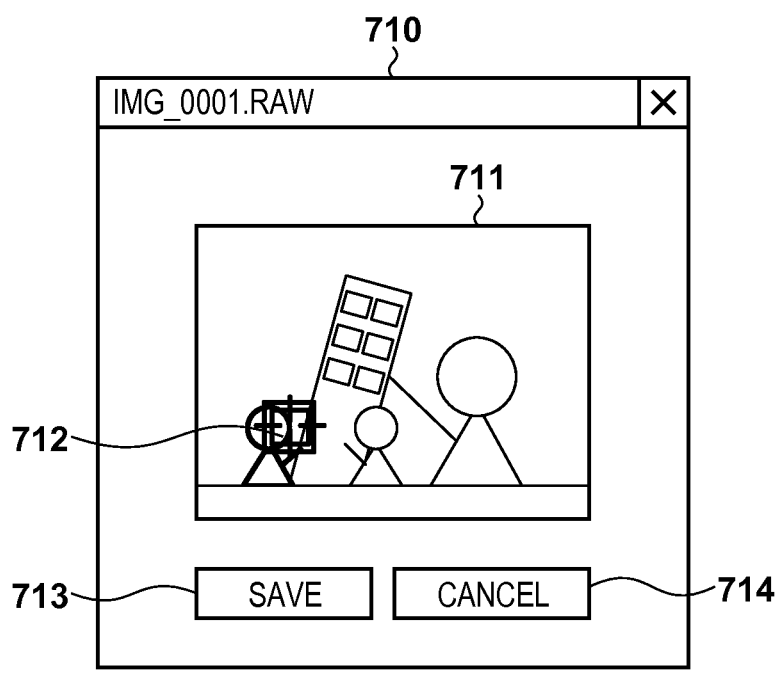

FIG. 7B shows, as an example, the reconstructed image window 710. If an instruction to designate a position on the thumbnail image for display 701 in the in-focus position window 700 is input, a reconstructed image 711 (in-focus image) in which a subject displayed at the designated position is brought into in-focus state is generated. The reconstructed image 711 is arranged and displayed in the reconstructed image window 710. As shown in FIG. 7B, an in-focus position marker 712 notifying the position of the designated subject that needs to be brought into in-focus state is superimposed and displayed on the reconstructed image 711. If the user wants to add the displayed reconstructed image 711 to the target light field information file as a new corresponding thumbnail image, the user can update the light field information file by inputting an instruction to a save button 713 in the reconstructed image window 710. After the light field information file has been updated, the display returns to the in-focus position window 700. If the display is terminated and returned to the list display of files, with respect to the updated file, the value that is displayed together with the focus information notification 302 in the application window 300 is incremented. If the user does not want to add the reconstructed image 711 as a corresponding thumbnail image, the user can revert to the in-focus position window 700 without updating the light field information file by inputting an instruction on a cancel button 714.

Addition Processing

Figure 8:
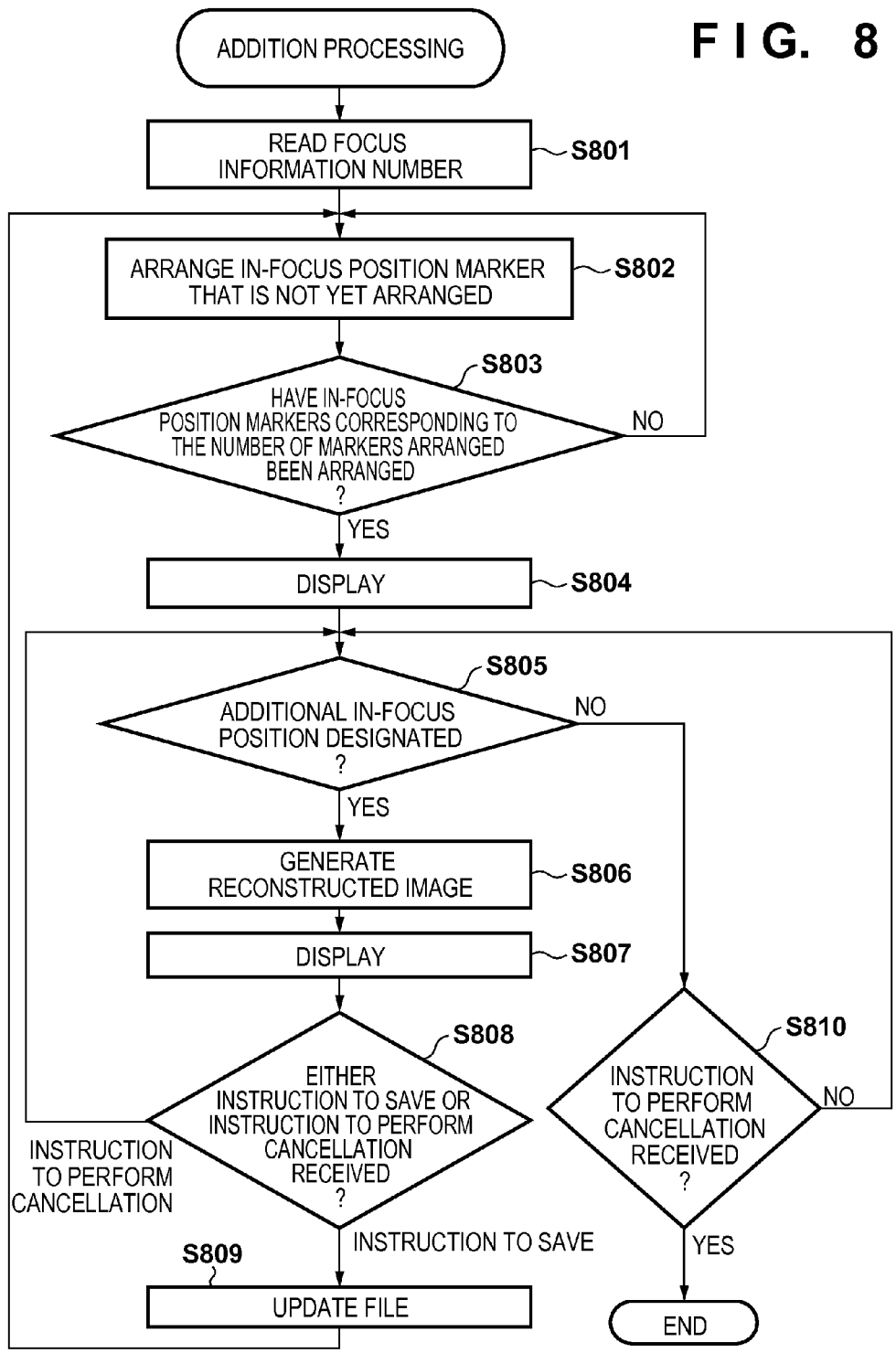
FIG. 8 is a flowchart illustrating addition processing executed by the PC 100 according to an embodiment of the present invention.

Addition processing for adding a corresponding thumbnail image executed upon an input of an instruction to select a thumbnail image for display 303 in the application window 300 displayed through the list display processing will now be described in detail with reference to a flowchart shown in FIG. 8. The processing corresponding to the flowchart is also executed by the control unit 101 in the same manner as described above.

In S801, the control unit 101 reads the focus information number 205 from the light field information file (target file) whose thumbnail image for display 303 was selected, and stores the focus information number 205 in the RAM 103 as the number of markers arranged.

In S802, the control unit 101 reads, from the target file, the focus information 206 of a corresponding thumbnail image in which an in-focus position marker 702 is not yet arranged on the thumbnail image for display 701. Then, the control unit 101 transmits, to the display control unit 106, information regarding the position of the subject in in-focus state that is included in the data so as to arrange an in-focus position marker 702 at a corresponding position in the thumbnail image for display 701 on the image data constituting the in-focus position window 700.

In S803, the control unit 101 determines whether or not a number of in-focus position markers 702 corresponding to the number of markers arranged are arranged in the image data constituting the in-focus position window 700. If it is determined that a number of in-focus position markers 702 corresponding to the number of markers arranged are not arranged, the control unit 101 returns the processing to S802. If it is determined that a number of in-focus position markers 702 corresponding to the number of markers arranged are arranged, the control unit 101 transitions the processing to S804.

In S804, the control unit 101 displays, on the display unit 107, the image data constituting the in-focus position window 700 generated by the operation input unit 105.

In S805, the control unit 101 determines whether or not an instruction to designate an in-focus position in a corresponding thumbnail image to be newly added has been input on the image of the thumbnail image for display. If it is determined that such an instruction has been input, the control unit 101 transitions the processing to S806. If it is determined that such an instruction has not been input, the control unit 101 transitions the processing to S810.

In S806, the control unit 101 acquires information regarding the subject distance to a subject displayed at the designated in-focus position, and generates a reconstructed image 711 in which the subject is brought into in-focus state based on the light field information 203 of the target file.

In S807, the control unit 101 transmits the generated reconstructed image 711 and the information regarding the in-focus position to the display control unit 106 so as to generate image data constituting the reconstructed image window 710 and display the image data on the display unit 107. To be specific, the display control unit 106 arranges the reconstructed image 711 on the image data constituting the reconstructed image window 710, and arranges an in-focus position marker 712 at the position indicated by the in-focus position on the reconstructed image 711 so as to generate the image data to be displayed.

In S808, the control unit 101 determines whether or not either an instruction to save the corresponding thumbnail image constituting the reconstructed image 711 in the reconstructed image window 710 or an instruction to perform cancellation has been input. If it is determined that an instruction to save the image has been input, the control unit 101 transitions the processing to S809. If it is determined that an instruction to perform cancellation has been input, the control unit 101 returns the processing to S805.

In S809, the control unit 101 changes the focus information number 205 in the target file to a value incremented by one, and updates the target file by adding, to the target file, the corresponding thumbnail image data 207 used to generate the reconstructed image 711 and the focus information 206 including the information regarding the in-focus position. After completion of the update, the control unit 101 returns the processing to S802.

If, on the other hand, it is determined in S805 that an instruction to designate an in-focus position has not been input, in S810, the control unit 101 determines whether or not an instruction to perform cancellation has been input. If it is determined that an instruction to perform cancellation has been input, the control unit 101 terminates the addition processing. If it is determined that an instruction to perform cancellation has not been input, the control unit 101 returns the processing to S805.

In the manner described above, with the image-viewing application of the present embodiment, it is possible to easily add a corresponding thumbnail image other than the image for display to the light field information file.

Deletion of Corresponding Thumbnail Image Data

Figure 9:
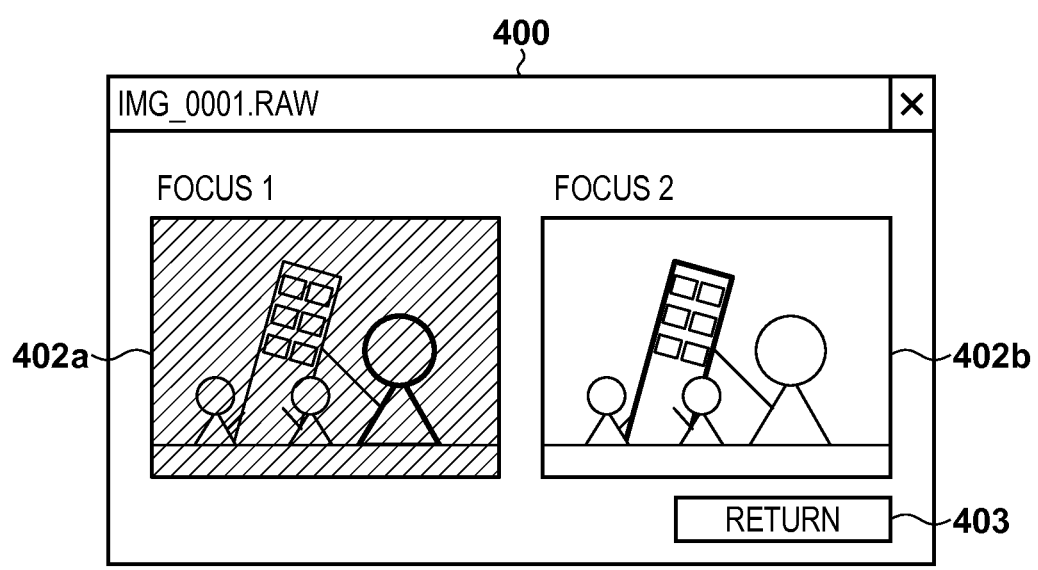
FIG. 9 is a diagram illustrating a display that is displayed when a corresponding thumbnail image is deleted according to an embodiment of the present invention.

With the image-viewing application of the present embodiment, it is also possible to delete corresponding thumbnail image data 207 included in a light field information file. For example, by selecting the corresponding thumbnail image 402a displayed on the application window 400 shown in FIG. 4 and operating a delete button, the display is transitioned to a display (hatched display) as shown in FIG. 9 in which the corresponding thumbnail image 402a is selected as a deletion target. Then, in this state, when the user inputs an instruction to terminate the display of the application window 400, the corresponding thumbnail image selected as a deletion target can be deleted from the target light field information file.

Deletion Processing

Figure 10:
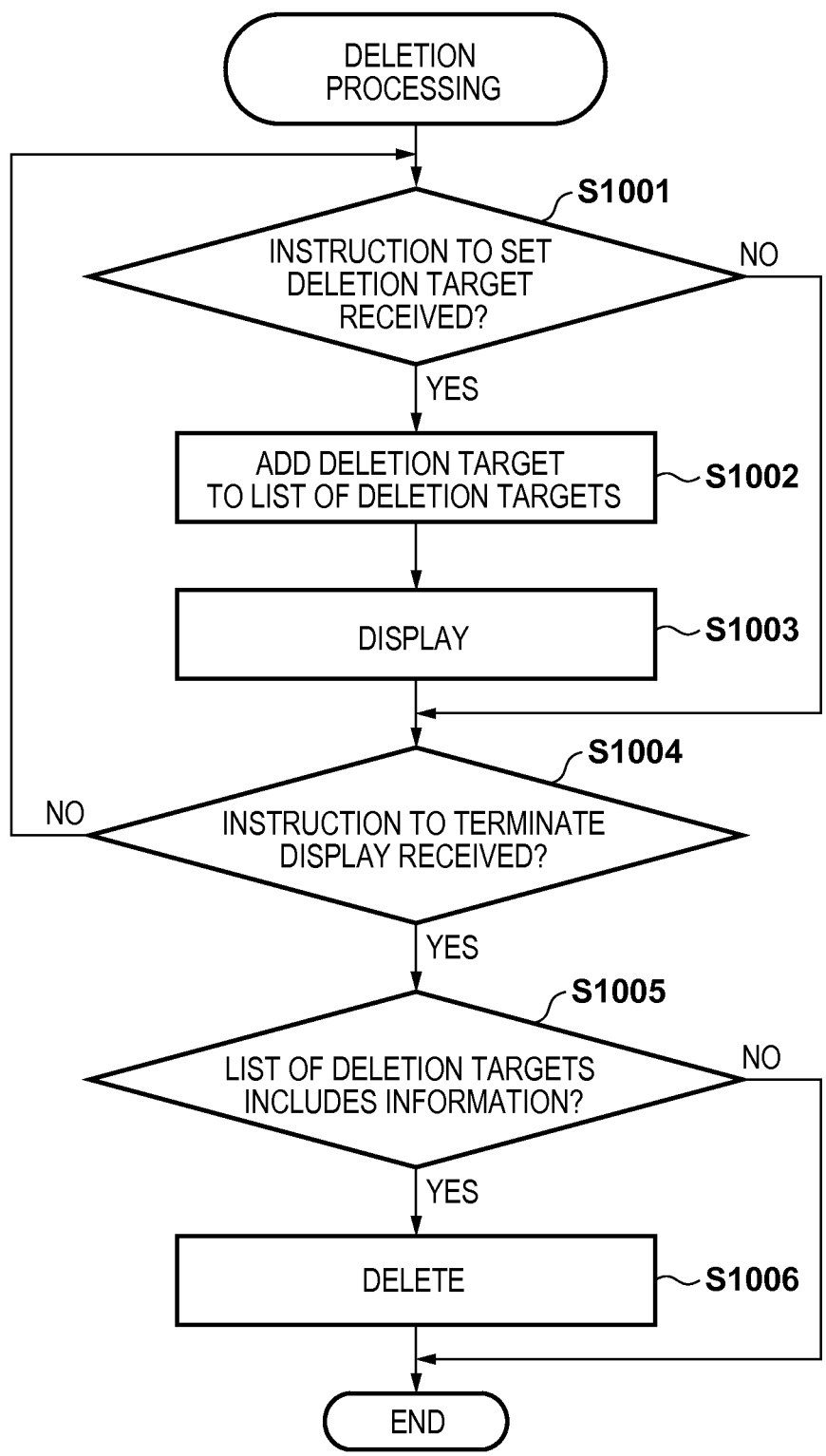
FIG. 10 is a flowchart illustrating deletion processing executed by the PC 100 according to an embodiment of the present invention.

Hereinafter, deletion processing for deleting the corresponding thumbnail image from the light field information file executed while the application window 400 is displayed will be described in detail with reference to a flowchart shown in FIG. 10. The processing corresponding to the flowchart is also executed by the control unit 101 in the same manner as described above.

In S1001, the control unit 101 determines whether or not an instruction to set one of the corresponding thumbnail images as a new deletion target has been input. If it is determined that a instruction to set one of the corresponding thumbnail images as a new deletion target has been input, the control unit 101 transitions the processing to S1002. If it is determined that a instruction to set one of the corresponding thumbnail images as a new deletion target has not been input, the control unit 101 transitions the processing to S1004.

In S1002, the control unit 101 acquires information for identifying the corresponding thumbnail image that has been set as a new deletion target, adds the acquired information to, for example, a list of deletion targets generated in the RAM 103 so as to store the information. The information for identifying the corresponding thumbnail image may be, for example, information indicating the order of arrangement of the corresponding thumbnail image from the head among the corresponding thumbnail images stored in the light field information file.

In S1003, the control unit 101 transmits the information for identifying the corresponding thumbnail image that has been set as a new deletion target to the display control unit 106 so as to generate image data in which the display has been changed to a state in which the corresponding thumbnail image is set as a deletion target, and display the generated image data on the display unit 107.

In S1004, the control unit 101 determines whether or not an instruction to terminate the display of the application window 400 displaying the corresponding thumbnail image has been input. If it is determined that an instruction to terminate the display of the application window 400 has been input, the control unit 101 transitions the processing to S1005. If it is determined that an instruction to terminate the display of the application window 400 has not been input, the control unit 101 returns the processing to S1001.

In S1005, the control unit 101 determines whether or not the list of deletion targets stored in the RAM 103 includes the information for identifying the corresponding thumbnail image set as a deletion target. If it is determined that the list of deletion targets includes the information, the control unit 101 transitions the processing to S1006. If it is determined that the list of deletion targets does not include the information, the control unit 101 terminates the deletion processing.

In S1006, the control unit 101 deletes, from the target light field information file, the corresponding thumbnail image data 207 and the focus information 206 of the corresponding thumbnail image included in the list of deletion targets. At this time, the control unit 101 re-sorts the sequence of focus information having a number of structures corresponding to the number of corresponding thumbnail images so as to arrange the data in order. Also, the control unit 101 changes the focus information number 205 to a new value obtained by subtracting the number of corresponding thumbnail images included in the list of deletion targets from the focus information number 205 in the light field information file. Also, the control unit 101 deletes the data of the list of deletion targets. After this processing, the control unit 101 terminates the deletion processing.

In the manner described above, with the image-viewing application of the present embodiment, it is possible to delete a corresponding thumbnail image other than the image for display included in the light field information file. Also, the image-viewing application of the present embodiment has been described as being configured to display corresponding thumbnail images so as to allow a deletion target to be selected, but the image-viewing application may be configured to display a list of focus information so as to allow a deletion target to be selected.

Also, the present embodiment has been described assuming that the light field information file includes a thumbnail image generated from a reconstructed image, but the embodiment of the present invention is not limited thereto. That is, the images included in the light field information file are not limited to thumbnail images, and reconstructed images generated based on the light field information may be included. Also, the light field information and these images do not necessarily need to be in a single file, and they may be in separate files and associated with each other.

As described above, according to the display control apparatus of the present embodiment, it is possible to improve the visibility of the list, and thus the user can easily view an image in a desired focus state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-053984, filed Mar. 17, 2014, which is hereby incorporated by reference herein in its entirety.

What is claimed is:

1. A display control apparatus comprising:
one or more processors; and
one or more memories coupled to the one or more processors and having instructions stored thereon which, when executed by the one or more processors, cause the display control apparatus to:
obtain information from storage in which light field information with which an image whose focus state has been changed can be generated is stored in association with an image having a predetermined focus state; and
perform control to display an image stored in the storage on a display unit, wherein in a case where an image having a different focus state from the predetermined focus state is associated with the light field information, a first display item that notifies that the image having the different focus state is present is displayed on the display unit together with the image having the predetermined focus state,
wherein in response to receiving an input of an instruction on the first display item, the image having the different focus state is displayed,
wherein in response to receiving an input of an instruction on the image having the predetermined focus state, information regarding the image having the predetermined focus state is displayed together with the image having the predetermined focus state,
wherein the predetermined focus state is a deep focus state, which is a focus state having a large depth of field,
wherein in response to designating a position in the image having the predetermined focus state, a reconstructed image in which a subject located at the designated position is in an in-focus state is generated based on the light field information, and
wherein in response to receiving an input of an instruction to save the reconstructed image, the reconstructed image is associated with the light field information as a new image.

2. The display control apparatus according to claim 1, wherein the first display item performs notification of the number of the images having the different focus state associated with the light field information.

3. The display control apparatus according to claim 1, wherein with respect to the light field information not being associated with the image having the different focus state, a second display item that notifies that the image having the different focus state is not present is displayed on the display unit together with the image having the predetermined focus state corresponding to the light field information.

4. The display control apparatus according to claim 1, wherein the instructions, when executed by the one or more processors, further cause the display control apparatus to, in response to selecting the image having the different focus state as a deletion target, delete the selected image from the associated light field information.

5. The display control apparatus according to claim 1, further comprising:
an image capturing unit,
wherein the instructions, when executed by the one or more processors, further cause the display control apparatus to store the light field information acquired by the image capturing unit in the storage.

6. The display control apparatus according to claim 1, wherein the image having the different focus state is not displayed before receiving the input of the instruction on the first display item.

7. The display control apparatus according to claim 1, wherein in response to receiving the input of the instruction on the image having the predetermined focus state, information for specifying a subject having an in-focus state is displayed on the image having the predetermined focus state.

8. The display control apparatus according to claim 1, wherein in response to receiving the input of the instruction on the first display item, the image having the different focus state is displayed together with information for specifying a subject having an in-focus state in the image having the different focus state.

9. The display control apparatus according to claim 8, wherein in response to receiving the input of the instruction on the first display item, the image having the different focus state is displayed by adding a third display item for specifying a subject having in-focus state.

10. The display control apparatus according to claim 1, wherein a list of a plurality of images stored in the storage is displayed on the display unit, and
wherein in the list displaying, if the image having the different focus state is present, the image having the different focus state is not displayed.

11. A control method for controlling a display control apparatus, the method comprising:
obtaining information from storage in which light field information with which an image whose focus state has been changed can be generated is stored in association with an image having a predetermined focus state; and
displaying an image stored in the storage on a display unit, wherein in a case where an image having a different focus state from the predetermined focus state is associated with the light field information, a first display item that notifies that the image having the different focus state is present is displayed on the display unit together with the image having the predetermined focus state,
wherein in response to receiving an input of an instruction on the first display item, the image having the different focus state is displayed,
wherein in response to receiving an input of an instruction on the image having the predetermined focus state, information regarding the image having the predetermined focus state is displayed together with the image having the predetermined focus state,
wherein the predetermined focus state is a deep focus state, which is a focus state having a large depth of field, wherein in response to designating a position in the image having the predetermined focus state, a reconstructed image in which a subject located at the designated position is in an in-focus state is generated based on the light field information, and wherein in response to receiving an input of an instruction to save the reconstructed image, the reconstructed image is associated with the light field information as a new image.

12. The control method according to claim 11, wherein the first display item performs notification of the number of the images having the different focus state associated with the light field information.

13. The control method according to claim 11, wherein with respect to the light field information determined as not being associated with the image having the different focus state, a second display item that notifies that the image having the different focus state is not present is displayed on the display unit together with the image having the predetermined focus state corresponding to the light field information.

14. The control method according to claim 11, further comprising in response to selecting the image having the different focus state as a deletion target, deleting the selected image from the associated light field information.

15. The control method according to claim 11, wherein the display control apparatus includes an image capturing unit, and wherein the control method further comprises storing the light field information acquired by the image capturing unit in the storage.

16. The control method according to claim 11, wherein the image having the different focus state is not displayed before receiving the input of the instruction on the first display item.

17. The control method according to claim 11, wherein in response to receiving the input of the instruction on the image having the predetermined focus state, information for specifying a subject having in-focus state is displayed on the image having the predetermined focus state.

18. A non-transitory computer-readable storage medium storing a program for causing a computer to execute the following processing:

obtaining information from a storage in which light field information with which an image whose focus state has been changed can be generated is stored in association with an image having a predetermined focus state; and displaying an image stored in the storage on a display unit, wherein in a case where an image having a different focus state from the predetermined focus state is associated with the light field information, a first display item that notifies that the image having the different focus state is present is displayed on the display unit together with the image having the predetermined focus state, wherein in response to receiving an input of an instruction on the first display item, the image having the different focus state is displayed, wherein in response to receiving an input of an instruction on the image having the predetermined focus state, information regarding the image having the predetermined focus state is displayed together with the image having the predetermined focus state, wherein the predetermined focus state is a deep focus state, which is a focus state having a large depth of field, wherein in response to designating a position in the image having the predetermined focus state, a reconstructed image in which a subject located at the designated position is in an in-focus state is generated based on the light field information, and wherein in response to receiving an input of an instruction to save the reconstructed image, the reconstructed image is associated with the light field information as a new image.

* * * * *